US009278630B2

(12) United States Patent
Couasnon et al.

(10) Patent No.: US 9,278,630 B2
(45) Date of Patent: Mar. 8, 2016

(54) VEHICLE SEAT (71) Applicant: Faurecia Sièges d'Automobile, Nanterre (FR)

(72) Inventors: Christian Couasnon, Flers (FR); Cedric Ruppe, Messei (FR)

(73) Assignee: Faurecia Sièges d'Automobile, Nanterre (FR)

( * ) Notice: Subject to any disclaimer, the term of this patent is extended or adjusted under 35 U.S.C. 154(b) by 0 days.

(21) Appl. No.: 14/091,516

(22) Filed: Nov. 27, 2013

(65) Prior Publication Data
US 2014/0145485 A1 May 29, 2014

(30) Foreign Application Priority Data

Nov. 27, 2012 (FR) ...................................... 12 61263

(51) Int. Cl.
*B60N 2/235* (2006.01)
*B60N 2/36* (2006.01)
*B60N 2/20* (2006.01)

(52) U.S. Cl.
CPC ................ *B60N 2/20* (2013.01); *B60N 2/2358* (2013.01)

(58) Field of Classification Search
CPC ............................... B60N 2/2358; B60N 2/20
USPC ....... 297/366, 367 R, 368, 369, 367 P, 367 L, 297/378.12, 378.14
See application file for complete search history.

(56) References Cited

U.S. PATENT DOCUMENTS

| 4,504,091 | A | * | 3/1985 | Ohshiro ................. 297/367 R X |
| 4,629,252 | A | * | 12/1986 | Myers et al. .......... 297/378.12 X |
| 5,558,403 | A | * | 9/1996 | Hammoud et al. ...... 297/378.12 |
| 5,611,599 | A | * | 3/1997 | Baloche et al. ...... 297/378.12 X |
| 5,685,610 | A | * | 11/1997 | Minai .................... 297/367 R X |
| 5,788,330 | A | * | 8/1998 | Ryan ......................... 297/378.12 |
| 6,290,297 | B1 | * | 9/2001 | Yu ............................. 297/378.12 |
| 7,416,255 | B2 | * | 8/2008 | Yamada et al. ........... 297/367 R |
| 8,690,251 | B2 | * | 4/2014 | Miller ....................... B60N 2/20 297/378.12 |
| 8,870,587 | B2 | * | 10/2014 | Nooner ......................... 439/367 |
| 8,944,509 | B2 | * | 2/2015 | Ootaki ..................... B60N 2/02 297/367 L |
| 8,985,690 | B2 | * | 3/2015 | Yamada ............... B60N 2/2358 297/367 L X |
| 2010/0123343 | A1 | * | 5/2010 | Bonk et al. ................. 297/378.12 |
| 2012/0062012 | A1 | * | 3/2012 | Miller et al. ............. 297/378.12 |
| 2014/0239695 | A1 | * | 8/2014 | Miller et al. ............. 297/378.12 |

* cited by examiner

Primary Examiner — Rodney B White
(74) Attorney, Agent, or Firm — Miller, Matthias & Hull LLP

(57) ABSTRACT

A seat having a hinge mechanism and a disabling system enabled to selectively allow and prevent a backrest from pivoting in relation to a seating portion. The hinge mechanism may have a case, a locking system, and a control member. The locking system may be locked and unlocked to prevent and enable pivoting of the backrest. The control member may be moveable between a rest position, locking the locking system, and an actuating position, unlocking the locking system. The disabling system may have a disabling member and a retaining member. The disabling member may have an active position, placing the control member in the actuating position. The retaining member may maintain the disabling member in the active position. The case may contain, in a radial dimension, at least half of both the disabling member and the retaining member.

14 Claims, 12 Drawing Sheets

VEHICLE SEAT

CROSS-REFERENCE TO RELATED APPLICATIONS

This application claims priority under the Paris Convention to the French Patent Application No. 12 61263, filed on Nov. 27, 2012.

FIELD OF THE DISCLOSURE

The invention relates to a vehicle seat.

In particular, the invention relates to a vehicle seat of the type comprising:
- a seating portion and a backrest pivotally mounted on the seating portion about a rotation axis, the backrest having an adjustable upright position and a folded position,
- at least one hinge mechanism adapted to adjust the upright position of the backrest, the hinge mechanism comprising a case delimiting a housing, a locking system placed in the housing of the case and a control member that can be actuated by a user, the case having an outer peripheral edge and comprising a first cheekplate secured to the seating portion and a second cheekplate secured to the backrest, the second cheekplate being pivotally mounted about the rotation axis on the first cheekplate, the locking system being adapted to have a locked state in which said locking system prevents pivoting of the second cheekplate relative to the first cheekplate, and an unlocked state in which said locking system authorises said pivoting, the control member having a rest position towards which said control member is urged, and being movable towards an actuating position, the control member being connected to the locking system so that, in the rest position of said control member, the locking system is in the locked state, and in the actuating position of said control member, the locking system is in the unlocked state,
- a disabling system adapted to enable the backrest to move between the upright and folded positions, the disabling system being arranged outside of the case of the hinge mechanism, and comprising a disabling member that can be actuated by the user and a retaining member, the disabling member being movable between an inactive position in which said disabling member authorises the control member to move between its rest and actuating positions, and an active position in which said disabling member places the control member in the actuating position, the retaining member being movable relative to the seating portion between a retaining position in which said retaining member maintains the disabling member in the active position, and a retracted position spaced apart from the retaining position.

With such a vehicle seat, the backrest can have several inclinations in its upright position in order to improve comfort for the occupant. It can also be moved towards its folded position in particular in order to allow for an access to rear seats or to a rear space located behind the vehicle seat, or in order to use a rear surface of the vehicle seat as a shelf.

BACKGROUND OF THE DISCLOSURE

A vehicle seat of this type providing entire satisfaction is known in FR 2 900 105. In the known vehicle seat, the retaining member has the form of a retaining cam pivotally mounted on the seating portion below one end of the frame of the backrest, and coming into retaining position when the disabling member passes from the inactive position to the active position. A pusher is pivotally mounted on the backrest in order to move the retaining cam during the return of the backrest towards the upright position.

The disabling system has a structure such that mounting it on the frames of the seating portion and of the backrest is imposed by constraints in terms of relative positioning, and can hardly be adapted to place the disabling system in different portions of the seat.

SUMMARY OF THE DISCLOSURE

The invention aims to overcome the above mentioned drawbacks.

To that end, the invention proposes a seat of the aforementioned type wherein the case of the hinge mechanism has a radial overall dimension defined by a cylindrical envelope extending along the rotation axis and passing by the outer edge of said case, and in that at least an essential portion (i.e. more than 50%, preferably more than 75%, in particular more than 90%) of the disabling member and at least an essential portion (i.e. more than 50%, preferably more than 75%, in particular more than 90%) of the retaining member are contained in the radial overall dimension of the case of the hinge mechanism.

The arrangement of most of the various components of the disabling system in the radial overall dimension of the hinge mechanism makes it possible to improve the compactness of the disabling system and to simplify the structure of it. The disabling system has thereby an improved adaptability that allows it to be mounted easily on different portions of the seat.

In particular, each of first and second cheekplates can have an outer lateral surface opposite the housing and substantially perpendicular to the rotation axis, and the seating portion can comprise a flange facing the outer lateral surface of one of the cheekplates chosen from among the first and second cheekplates, the disabling system being arranged between the flange and the outer lateral surface of said cheekplate.

The disabling member can be pivotally mounted on the rotation axis and have a maximum dimension measured perpendicularly to the rotation axis less than or substantially equal to a maximum dimension measured perpendicularly to the rotation axis of the outer edge of the case.

The retaining member can be pivotally mounted on the seating portion about a pivot axis parallel to the rotation axis, said pivot axis being located inside the envelope defining the radial overall dimension of the case of the hinge mechanism.

The disabling system can further comprise a coupling device adapted to move the retaining member from the retracted position to the retaining position when the disabling member is moved from the inactive position towards the active position. In particular, the coupling device can include:
- two coupling elements, one formed by a pin and the other by a guide surface, and one carried by the disabling member and the other by the retaining member, the guide surface having a cam portion and a hooking portion,
- a biaising member adapted to maintain the coupling element carried by the retaining member against the coupling element carried by the disabling member, the coupling elements being arranged so that the pin is moved along the cam portion of the guide surface when the disabling member is moved from the inactive position towards the active position, and so that the pin is placed in the hooking portion of the guide surface when the disabling member is in the active position.

The disabling system can further comprise a releasing device adapted to move the retaining member from the retaining position to the retracted position in a determined position of the second cheekplate relative to the first cheekplate during the pivoting of the backrest in an uprighting direction from the folded position towards the upright position.

An essential portion (i.e. more than 50%, preferably more than 75%, in particular more than 90%) of the releasing device can then be contained in the radial overall dimension of the case of the hinge mechanism.

The releasing device can include:
an abutment movable together with the backrest along a stroke, and
a leg associated to the retaining member and extending in the stroke of the abutment, the leg being adapted to interfere with the abutment in the determined position of the second cheekplate relative to the first cheekplate during the pivoting of the second cheekplate relative to the first cheekplate in the uprighting direction.

The leg can be urged towards a close position in which said leg is in contact with the retaining member, and can be moved towards a spaced apart position in which said leg is spaced apart from the retaining member during the pivoting of the backrest in a folding direction from the upright position towards the folded position.

In an embodiment, the backrest can comprise a frame having two opposite lateral surfaces substantially perpendicular to the rotation axis, the disabling member and the retaining member being placed on the side of one of the lateral surfaces of the frame of the backrest, the abutment being fixed on said lateral surface.

In another embodiment, in a manner complementary or independent of the previously defined provisions concerning in particular the arrangement of the disabling and maintaining members within the radial overall dimension of the case, the disabling system comprises a memory device adapted to enable the second cheekplate to be returned in a determined adjustable position during the pivoting of the backrest in the uprighting direction. To do so, the abutment of the releasing device can be disengaged. The abutment can thereby be movably mounted relative to the backrest between an unsecured position in which said abutment is immobile relative to the backrest, and a secured position in which said abutment is secured to the backrest, the abutment being connected to the disabling member so that, in the inactive position of said disabling member, said abutment is in the unsecured position, and in the active position of said disabling member, said abutment is in the secured position.

In particular, the releasing device can further comprise a bushing secured to the second cheekplate and extending along the rotation axis, the abutment being pivotally mounted about the rotation axis and secured to the bushing in the secured position of said abutment and spaced apart from the bushing in the unsecured position of said abutment.

The locking system can include inner teeth carried by the second cheekplate and at least one slide movably mounted inside the housing of the case along a radial direction relative to the rotation axis, the slide being provided with outer teeth adapted to cooperate with the inner teeth of the second cheekplate, the outer teeth of the slide being engaged with the inner teeth of the second cheekplate in the locked state of the locking system and being spaced apart from the inner teeth of the second cheekplate in the unlocked state of the locking system, the bushing and the abutment having respectively teeth, one inner and the other outer, adapted to cooperate with each other, the teeth of the abutment being engaged with the teeth of the bushing in the secured position of said abutment and the teeth of the abutment being spaced apart from the teeth of the bushing in the unsecured position of said abutment, the teeth of the bushing and of the abutment having a pitch identical to that of the teeth of the second cheekplate and of the slide.

BRIEF DESCRIPTION OF THE DRAWINGS

Other objects and advantages of the invention will appear when reading the following description of particular embodiments of the invention given by way of an unrestricted example, the description being made in reference to the annexed drawings wherein.

DETAILED DESCRIPTION OF THE DISCLOSURE

In the figures, the same references designate identical or similar elements.

Figure 1:
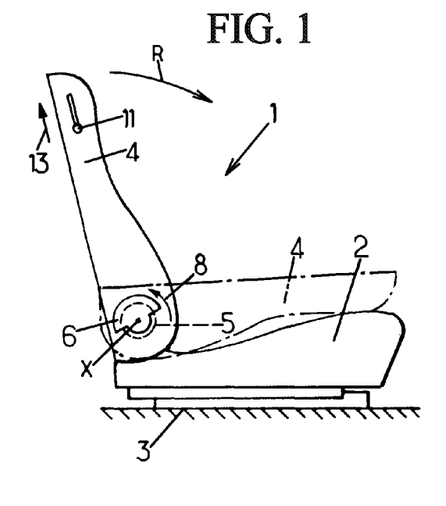
FIGS. 1 and 2 are respectively lateral and rear diagrammatical views of a vehicle seat according to a first embodiment of the invention, the seat comprising a seating portion and a backrest pivotally mounted on the seating portion and having an adjustable upright position and a folded position.
Figure 2:
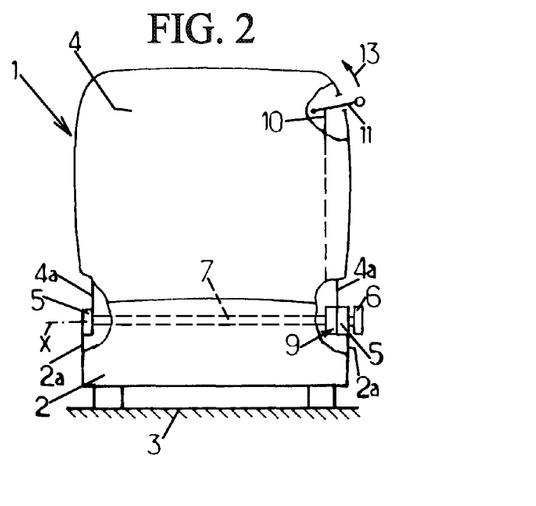

As shown diagrammatically in FIGS. 1 and 2, the invention relates to a vehicle seat 1, in particular a front seat of a motor vehicle, which comprises, on the one hand, a seating portion 2 mounted on a floor 3 of the vehicle, and on the other hand, a backrest 4 pivotally mounted on the seating portion 2 about a horizontal transverse rotation axis X.

More precisely, the backrest 4 comprises two rigid frames 4a of which lower ends are connected respectively to two rigid frames 2a of the seating portion, on each side of the seat, by two symmetrical hinge mechanisms 5 which are controlled by a same handle 6. This handle 6 is secured to a rigid connecting bar 7 that connects the two hinge mechanisms 5 to each other and which extends parallel to the rotation axis X.

Possibly, the seat 1 could comprise a hinge mechanism 5 on a single side of the seat, in which case the connecting bar 7 would be suppressed.

The actuating of the handle 6 in an angular direction 8 shown in FIG. 1 makes it possible to simultaneously unblock the two hinge mechanisms 5, so that the user of the seat 1 can adjust the inclination of the backrest 4 in an upright position (shown as a dashed line in FIG. 1) by acting directly on this backrest 4, the backrest being generally urged towards the front by at least one spring (not shown).

In addition, one of the two hinge mechanisms 5 is associated with a disabling system 9 which is connected, through a cable 10 or other mechanical connection (for example, a rigid control rod), to a hand lever 11 generally pivotally mounted on the backrest 4. This hand lever 11 can possibly be urged towards a bottom rest position by a spring (not shown), and it can be moved upwards by a user, in the direction of the arrow 13.

During the actuating of the hand lever 11 in the direction of the arrow 13, as it will be explained hereinafter, the two hinge mechanisms 5 are unblocked thereby allowing the backrest 4 to swing to the maximum towards the front in the direction of the arrow R, until a folded position (shown as a chain dotted line in FIG. 1) is reached. During this movement, the disabling system 9 then maintains the hinge mechanisms 5 in their unlocked position even after releasing the hand lever 11, as long as the backrest 4 does not pass in a determined position when the backrest is moved in an uprighting direction from its folded position towards the upright position, as it will be explained hereinafter.

Figure 3:
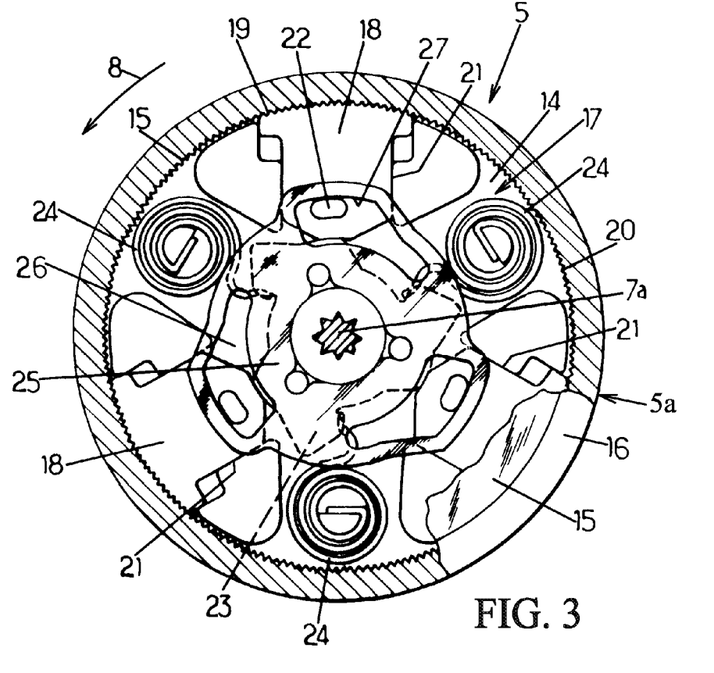
FIG. 3 is a cut-away view of a hinge mechanism the seat of FIGS. 1 and 2.

As shown in FIG. 3, each of the two hinge mechanisms 5 comprises a case 5a which comprises:
  a first cheekplate 14, fixed, which extends perpendicularly to the rotation axis X and which is secured to the rigid frame 2a of the seating portion 2, the fixed cheekplate 14 having opposite inner and outer lateral surfaces, substantially perpendicular to the rotation axis X,
  a second cheekplate 15, mobile, which extends perpendicularly to the rotation axis X and which is secured to the frame 4a of the backrest 4, the mobile cheekplate 15 being pivotally mounted about the rotation axis X on the fixed cheekplate 14 and having opposite inner and outer lateral surfaces, substantially perpendicular to the rotation axis X,
  a crown 16 which is crimped onto the outside edge of the fixed 14 and mobile 15 cheekplates.

The case 5a has a radial overall dimension, measured perpendicularly to the rotation axis X, defined by a cylindrical envelope E extending along the rotation axis X and passing by an outer peripheral edge carried by the crown 16. The envelope E is materialised by a thin line in FIG. 5. According to this particular embodiment, the envelope E is virtual, in that it is not materialised by a physical element but is defined by a geometrical shape, here a cylinder. It aims at providing a visualisation of the radial overall dimension of the case 5a. The case 5a delimits, moreover, a housing between the facing inner surfaces of the fixed 14 and mobile 15 cheekplates.

The hinge mechanism 5 also comprises a locking system 17 placed in the housing of the case 5a.

In the embodiment shown, the locking system 17 comprises three slides 18, which are arranged at 120° from each other and which each have outer teeth 19 adapted to engage with inner teeth 20, circular, carried by the mobile cheekplate 15. Each of these slides 18 is slidably mounted along a radial direction relative to the rotation axis X, in a guide 21 which is secured to the fixed cheekplate 14. The slides 18 can then be moved between, on the one hand, an engaging position in which their outer teeth 19 are engaged with the inner teeth 20 of the mobile cheekplate 14 in order to block the hinge mechanism 5, and on the other hand, a retraced position in which their outer teeth 19 does not cooperate with the inner teeth 20 of the mobile cheekplate 14. Each slide 18 further comprises a pin 22 that protrudes axially towards the mobile cheekplate 15.

The locking system 17 also comprises springs 24 which are mounted on the fixed cheekplate 14 and which urge a cam 23, or other manoeuvring member, towards a rest position in which it places the slides 18 in their engaging position. The cam 23 can pivot in the angular direction 8 by allowing the slides 18 to slide towards their retraced position, thereby releasing the hinge mechanism 5. A plate 25, rigid, is rigidly connected to the cam 23 and extends radially between the cam 23 and the mobile cheekplate 15 by partially covering the slides 18. The plate 25 comprises three cut-outs 26 in which the pins 22 of the slides 18 are engaged, each of these pins 22 cooperating with a cam edge 27 which delimits the corresponding cut-out 26 radially outwards and which is shaped to move the corresponding slide radially inwards when the cam 23 rotates in the angular direction 8.

The hinge mechanism 5 further comprises a control member comprising a control shaft 7a provided with grooves, secured to the connecting bar 7 and press fitted in the cam 23. The control shaft 7a is connected to the handle 6 so as to be able to be actuated by a user.

The control shaft 7a is urged by the springs 24 towards a rest position in which the cams 23 of the locking systems 17 of the two hinge mechanisms 5 are in their rest position, the slides 18 of the locking systems 17 of the two hinge mechanisms 5 being simultaneously in their engaging positions. The locking system 17 is then in a locked state that prevents pivoting of the mobile cheekplate 15 relative to the fixed cheekplate 14. When the handle 6 is actuated in the angular direction 8, the control shaft 7a and the connecting bar 7 are moved towards an actuating position and the cams 23 of the locking systems 17 of the two hinge mechanisms 5 pivot simultaneously in order to place the slides 18 of the locking systems 17 of the two hinge mechanisms 5 simultaneously into their retracted positions. The locking system is then in an unlocked state authorising pivoting of the mobile cheekplate 15 relative to the fixed cheekplate 14.

Figure 4:
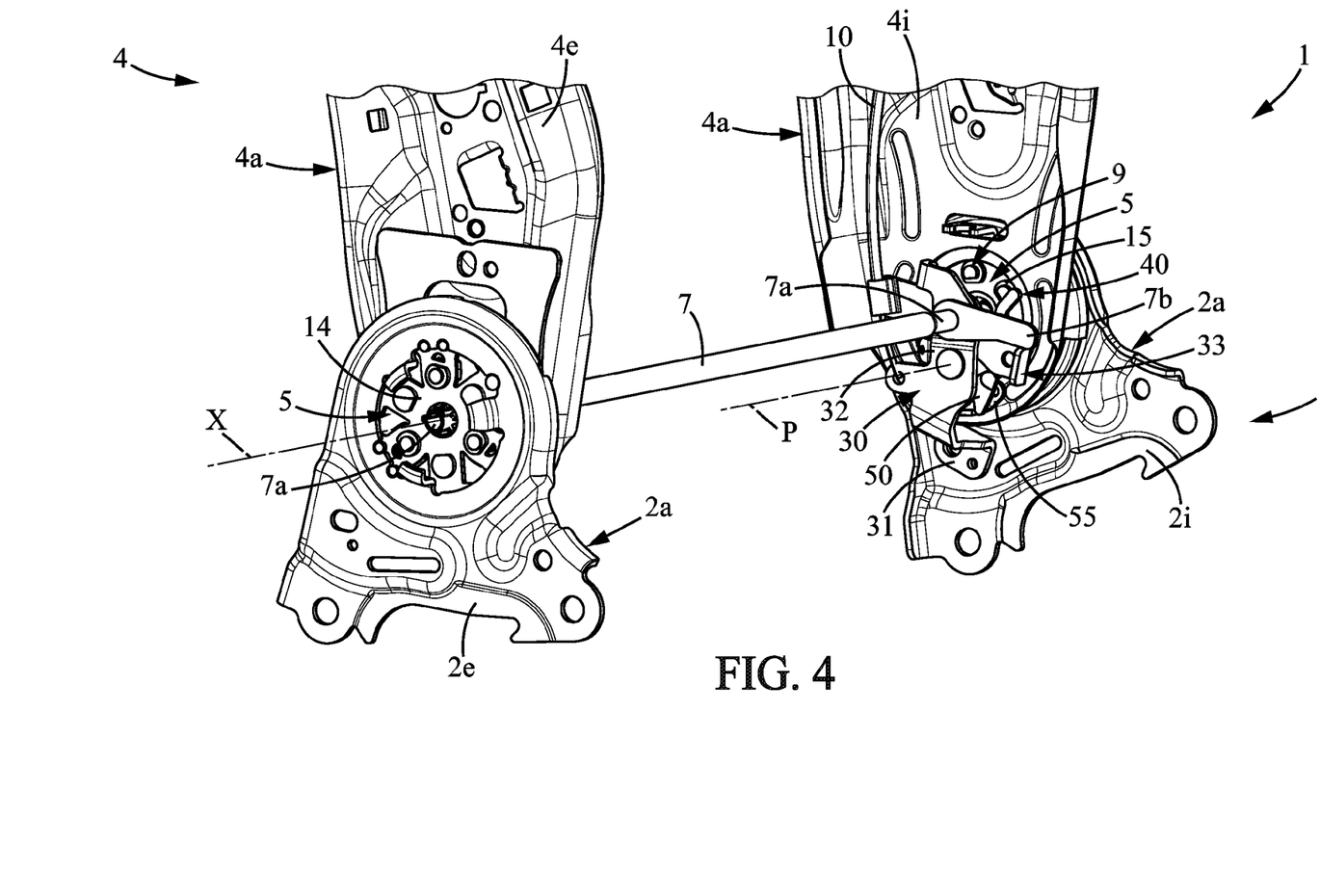
FIG. 4 is a perspective view of a portion of the seat of FIGS. 1 and 2, showing a disabling system the hinge mechanism.

As shown more in details in FIG. 4, each of the frames 2a of the seating portion 2 has two lateral surfaces, one inner 2i and the other outer 2e, opposite and substantially perpendicular to the rotation axis X, the inner lateral surfaces 2i of the frames 2a of the seating portion 2 facing one another. In the same way, each of the frames 4a of the backrest 4 has two lateral surfaces, one inner 4i and the other outer 4e, opposite and substantially perpendicular to the rotation axis X. The inner lateral surfaces 4i of the frames 4a of the backrest 4 face each other and the outer lateral surfaces 4e of the frames 4a of the backrest 4 face respectively the inner lateral surfaces 2i of the frames 2a of the seating portion 2.

The above mentioned disabling system 9 forms a mechanism arranged outside of the case 5a of the hinge mechanism 5 making it possible to move the backrest 4 between its upright and folded positions, while maintaining the locking systems 17 of the hinge mechanisms 5 in their unlocked state.

In a first embodiment shown in FIGS. 4 to 9, the disabling system 9 is internal, i.e. placed on the side of the inner lateral surface 4i of one of the frames 4a of the backrest 4.

To do so, on one of the sides of the seat 1, the seating portion 2 comprises a flange 30 facing the inner lateral surface 4i of the frame 4a of the backrest 4. In particular, the flange 30 comprises a fastening portion 31 that is secured, by welding, screwing or any other suitable means, to the inner lateral surface 2*i* of the frame 2*a* of the seating portion 2, under the end of the frame 4*a* of the backrest 4. The flange 30 also comprises a support portion 32 spaced apart from the fastening portion 31 along the rotation axis X and facing the inner lateral surface 4*i* of the frame 4*a* of the backrest 4. The support portion 32 of the flange 30 is thereby facing the outer lateral surface of the mobile cheekplate 15. The disabling system 9 can then be mounted in a space arranged between the support portion 32 of the flange 30 and the inner lateral surface 4*i* of the frame 4*a* of the backrest 4, facing the outer lateral surface of the mobile cheekplate 15.

Figure 5:
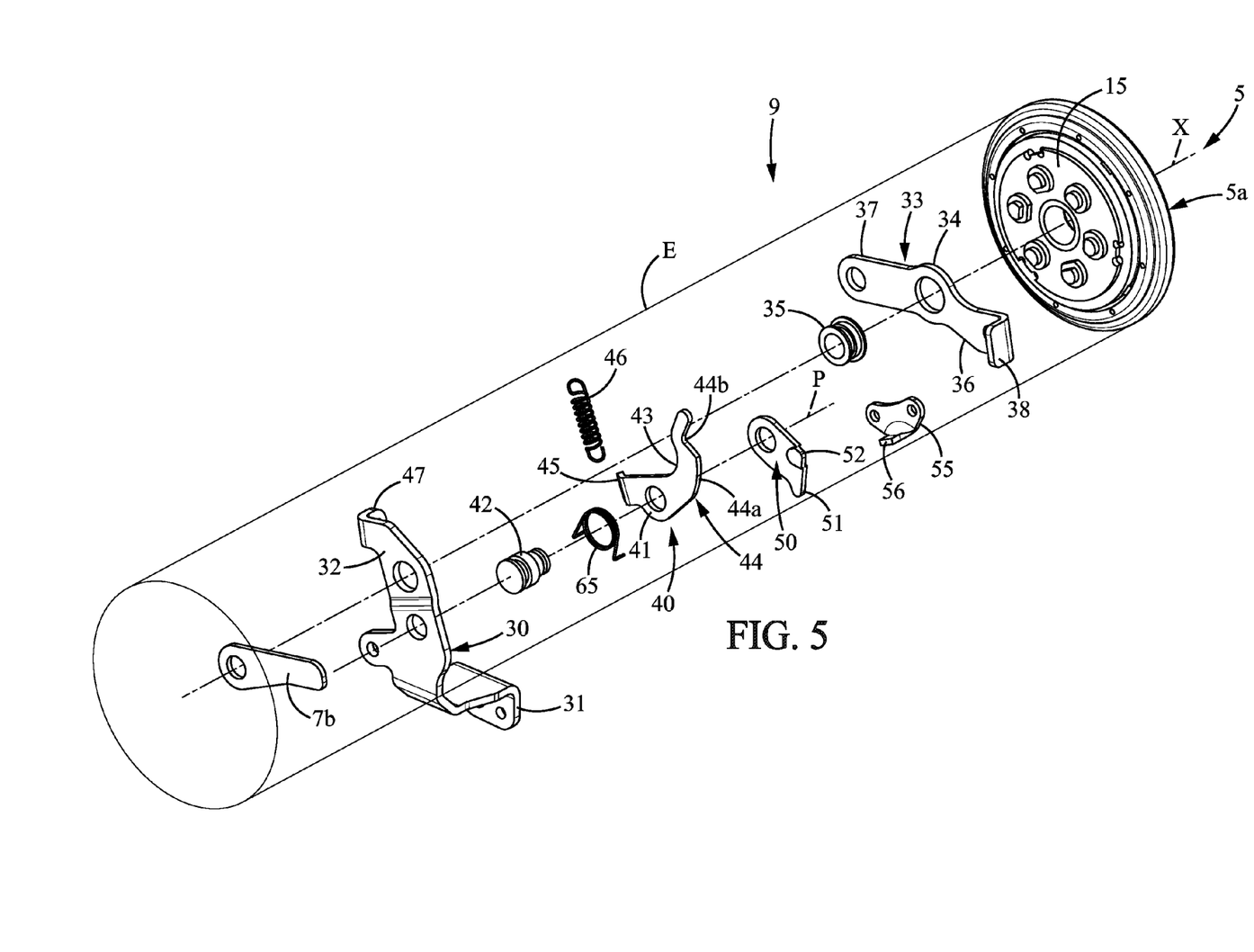
FIG. 5 is an exploded perspective view of the disabling system of FIG. 4, FIGS. 6 to 9 are lateral views of the disabling system of FIG. 4 in successive different positions during the movement of the backrest between its upright and folded positions.

As shown in FIGS. 4 and 5, in addition to the control shaft 7*a*, the control member comprises a control lever 7*b* integral in rotation with the control shaft 7*a* and extending radially relative to the rotation axis X. The control lever 7*b* is, for example, arranged on the other side of the support portion 32 of the flange 30 relative to the space receiving the disabling system 9.

The disabling system 9 comprises a disabling member having, in the embodiment shown, the form of a disabling lever 33.

The disabling lever 33 comprises a central hub 34 pivotally mounted about the rotation axis X, for example through a bearing 35. The disabling lever 33 also comprises first 36 and second 37 arms extending from the central hub 34 substantially radially relative to the rotation axis X in two opposite directions. The first arm 36 is provided with a finger 38 extending along the rotation axis X opposite the inner lateral surface 4*i* of the frame 4*a* of the backrest 4 so as to be able to cooperate with the control lever 7*b*. The first arm 36 also comprises a first coupling element carried out in the form of a pin 39 (visible in a see-through manner in FIGS. 6 to 9) protruding relative to a lateral surface perpendicular to the rotation axis X, facing the inner lateral surface 4*i* of the frame 4*a* of the backrest 4. The second arm 37 is connected to the hand lever 11 by means of the cable 10 so that the user can actuate the disabling lever 33.

As reflected in FIGS. 5 to 9, the first 36 and second 37 arms have a maximum dimension measured perpendicularly to the rotation axis X less than a maximum dimension measured perpendicularly to the rotation axis X of the outer edge of the case 5*a* of the hinge mechanism 5. The disabling lever 33 is thereby us entirely contained in the envelope E defining the radial overall dimension of the case 5*a*. Alternatively, the first 36 and second 37 arms could have a maximum dimension substantially greater than or equal to that of the outer edge of the case 5*a* so that an essential portion of the disabling lever 33, i.e. more than 50%, preferably more than 75%, in particular more than 90% of the disabling lever 33 is contained in the envelope E defining the radial overall dimension of the case 5*a*.

The disabling system 9 also comprises a retaining member that has, in the embodiment shown, the form of a retaining lever 40.

The retaining lever 40 comprises a hub 41 pivotally mounted, for example through a bearing 42, on the support portion 32 of the flange 30 about a pivot axis P parallel to the rotation axis X and located under the rotation axis X. The retaining lever 40 also comprises a blocking arm 43 extending from the hub 41 and having a curvature such that the blocking arm extends at a substantially constant distance relative to the rotation axis X, equal to the distance between the rotation axis X and the pivot axis P. The blocking arm 43 comprises a second coupling element carried out on a lower edge in the form of a guide surface 44. The guide surface 44 has a substantially circular cam portion 44*a* arranged in the vicinity of the hub 41, and a hooking portion 44*b* arranged at a distance from the hub 41 and having a concavity directed opposite the rotation axis X. Opposite the blocking arm 43, the retaining lever 40 comprises a return leg 45 extending substantially radially relative to the pivot axis P. The return leg 45 is connected by a pulling spring 46 to a folded back portion 47 formed on the support portion 32 of the flange 30, extending along the rotation axis X in the direction of the inner lateral surface 4*i* of the frame 4*a* of the backrest 4.

As reflected in FIGS. 5 to 9, the pivot axis P is located inside the envelope E defining the radial overall dimension of the case 5*a* of the hinge mechanism 5 and the retaining lever 40 has dimensions such that, as for the disabling lever 33, the whole or at least an essential portion, greater than 50%, more preferably greater than 75%, in particular greater than 90%, of the retaining lever 40 is contained in the envelope E defining the radial overall dimension of the case 5*a*.

The disabling system 9 further comprises a leg 50 pivotally mounted about the pivot axis P and extending substantially radially relative to the pivot axis P to a free end provided with a protuberance 51. On a lateral surface opposite the inner lateral surface 4*i* of the frame 4*a* of the backrest 4, the leg 50 has a protrusion 52 extending along the pivot axis P.

The disabling system 9 further comprises an abutment 55 movable together with the backrest along a stroke. In the first embodiment, the abutment 55 is fixed onto the inner lateral surface 4*i* of the frame 4*a* of the backrest 4 so that the protuberance 51 of the leg 50 extends in the stroke of the abutment 55. In the first embodiment shown, the abutment 55 is placed in the vicinity of the edge of the end of the frame 4*a*. The abutment 55 comprises a finger 56 extending along the rotation axis X opposite the inner lateral surface 4*i* of the frame 4*a* of the backrest 4 so as to be able to cooperate with the protuberance 51 of the leg 50.

As reflected in FIGS. 5 to 9, the leg 50 and the abutment 55 are dimensioned and arranged so that the whole or at least the essential portions, greater than 50%, more preferably greater than 75%, in particular greater than 90%, of the leg 50 and of the abutment 55 are contained in the envelope E defining the radial overall dimension of the case 5*a*.

Figure 6:
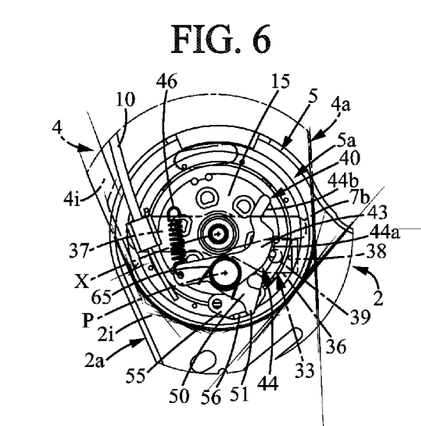

The disabling system 9 assembled in a rest state is shown in FIG. 6.

In the rest position of the control shaft 7*a*, also corresponding to the rest position of the control lever 7*b*, the control lever 7*b* extends substantially horizontally. The disabling lever 33 also extends substantially horizontally so that the control lever 7*b* rests on the finger 38 of the first arm 36. The retaining lever 40, interposed between the disabling lever 33 and the inner lateral surface 4*i* of the frame 4*a* of the backrest 4, is urged by the pulling spring 46 into a retracted position in which the cam portion 44*a* of the guide surface 44 is maintained in contact with the pin 39 of the first arm 36 of the disabling lever 33. The leg 50 is interposed between the retaining lever 40 and the inner lateral surface 4*i* of the frame 4*a* of the backrest 4. The leg 50 is associated, in the first embodiment, to the retaining lever 40 by means of a torsion spring 65 urging the leg 50 towards a close position in which the protuberance 52 is in contact with the lower edge of the retaining lever 40, in a straight portion located substantially between hub 41 and the cam portion 44*a*. The protuberance 51 of the leg 50 extends in the stroke of the finger 56 of the abutment 55.

In this position, the locking systems 17 of the hinge mechanisms 5 are in their locked state. The disabling lever 33 is then in an inactive position authorising a movement of the control lever 7*b* and of the control shaft 7*a* between their rest and actuating positions. Thus, when the user turns the handle 6 in the angular direction 8, the control shaft 7a and the control lever 7b can pivot from their rest position towards their actuating position so as to pass the locking systems 17 of the hinge mechanisms 5 into their unlocked state, allowing for the adjusting of the upright position of the backrest 4 as explained hereinabove. Meanwhile, the disabling lever 33 remains in inactive position.

By the adjustment, the finger 56 of the abutment 55 can come into contact with the protuberance 51 of the leg 50:
  either in the anti-clockwise direction corresponding to the uprighting direction of the backrest 4, in which case the abutment 55 spaces apart the retaining lever 40 of the pin 39 from the disabling lever 33 by means of the leg 50,
  or in the clockwise direction corresponding to a folding direction of the backrest 4, in which case the abutment 55 moves the leg 50 towards a spaced apart position at a distance from the retaining lever 40 without moving the retaining lever 40.

In one case as in the other, the movement of the abutment 55 has no consequence on the state of the locking systems 17 of the hinge mechanisms 5.

Figure 7:
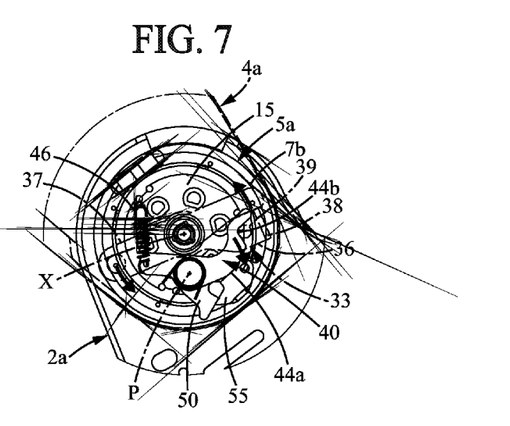

In FIG. 7, when the user wants to swing the backrest 4 in the folding direction from the upright position towards the folded position, he actuates the hand lever 11. Meanwhile, the cable 10 pivots the disabling lever 33 in the anti-clockwise direction towards an active position. The control lever 7b is moved in the anti-clockwise direction together with the disabling lever 33 by means of the finger 38 of the first arm 36, to its actuating position. The locking systems 17 of the hinge mechanisms pass into their unlocked state.

During the movement of the disabling lever 33, the pin 39 of the first arm 36 moves along the cam portion 44a of the guide surface 44 of the retaining lever 40. The pin 39 reaches the hooking portion 44b when the disabling lever 33 is in the active position. The retaining lever 40 then swings in the clockwise direction in order to maintain the pin 39 in the concavity of the hooking portion 44b. The retaining lever 40 is then in a retaining position in which it retains the disabling lever 33 in the active position. The locking systems 17 of the hinge mechanisms are then maintained in their unlocked state making it possible to fold the backrest 4.

As reflected in the above, the pin 39 and the guide surface 44 of the retaining lever 40 form a coupling device adapted to move the retaining lever 40 from the retracted position to the retaining position when the disabling lever 33 is moved from the inactive position towards the active position.

Figure 8:
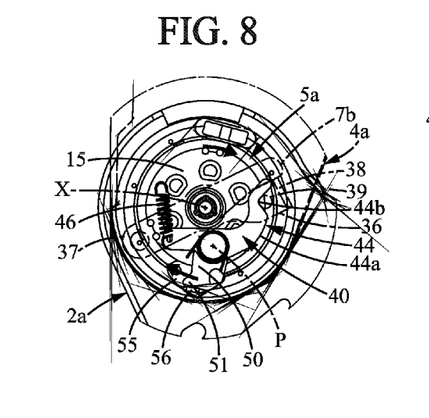

In FIG. 8, when the backrest 4 is pivoted in the folding direction from the upright position towards the folded position, the leg 50 can be spaced apart from the retaining lever 40 by the abutment 55 before coming back into contact with the retaining lever 40.

Figure 9:
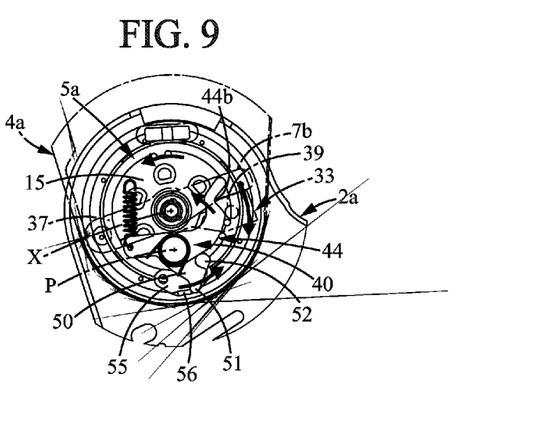

In FIG. 9, during the pivoting of the backrest 4 in the uprighting direction from the folded position towards the upright position, when, in a determined position of the backrest 4 defined by the relative position of the abutment 55 and of the protuberance 51 of the leg 50, the protuberance 51 interferes with the finger 56 of the abutment 55, the abutment 55 moves the leg 50 in contact with the retaining lever 40 by means of the protuberance 52 in the anti-clockwise direction. The hooking portion 44b of the retaining lever 40 is spaced apart from the retaining position, thereby releasing the pin 39 from the disabling lever 33. Under the effect of the springs 24 of the locking systems 17 of the hinge mechanisms 5, the locking systems 17 return to their locked state, the disabling lever 33 returns to its inactive position and the control lever 7b returns to its rest position. The retaining lever 40 pressing against the pin 39 of the disabling lever returns to its retracted position.

As reflected in the above, the leg 50 and the abutment 55 form a releasing device of the disabling system 9 adapted to move the retaining lever 40 from the retaining position to the retracted position in the determined position of the backrest 4 during the pivoting of the backrest in the uprighting direction.

Figure 10:
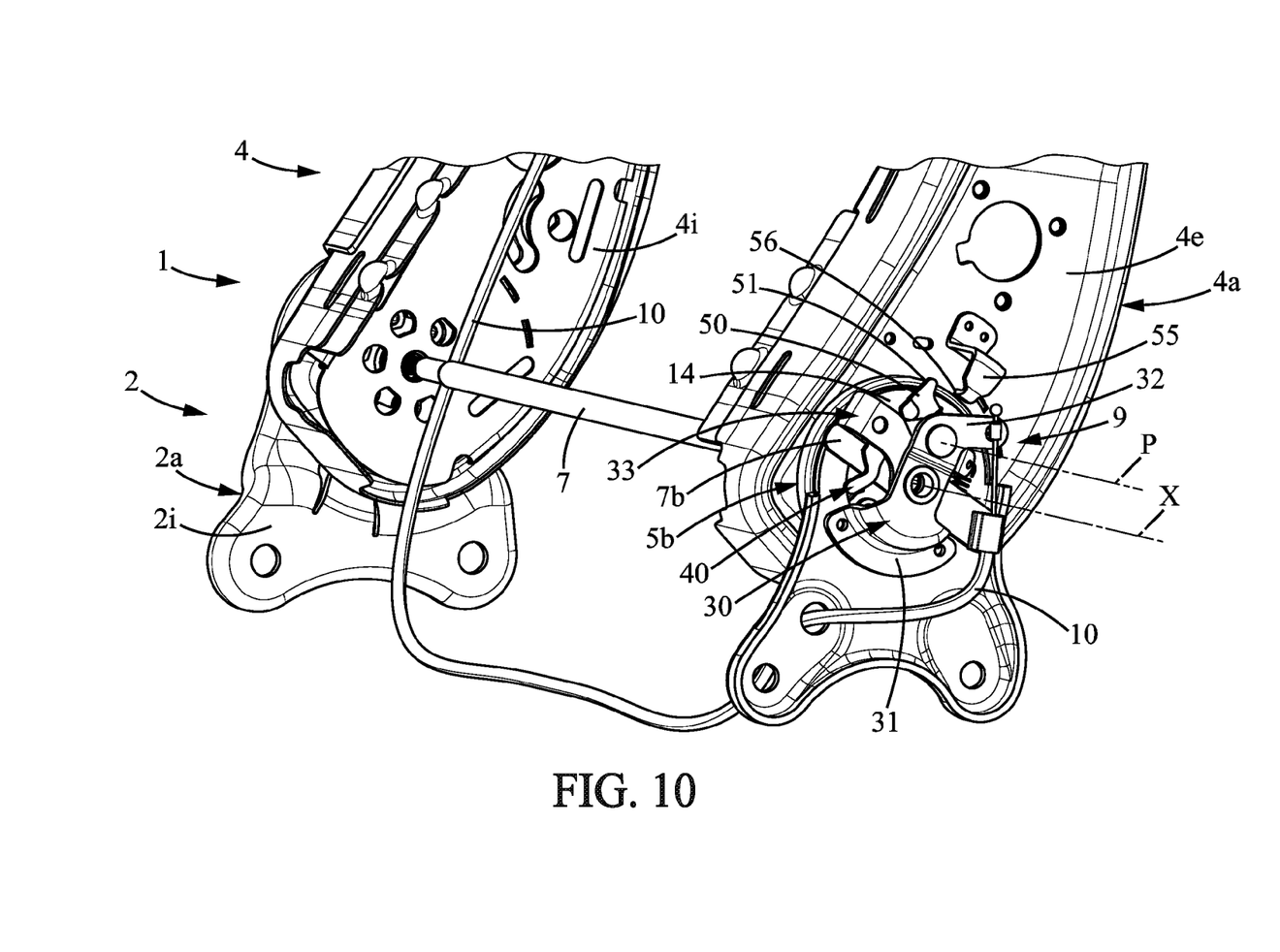
FIG. 10 is a perspective view of a portion of a vehicle seat according to an alternative of the first embodiment of the invention, showing the disabling system of the hinge mechanism.
Figure 11:
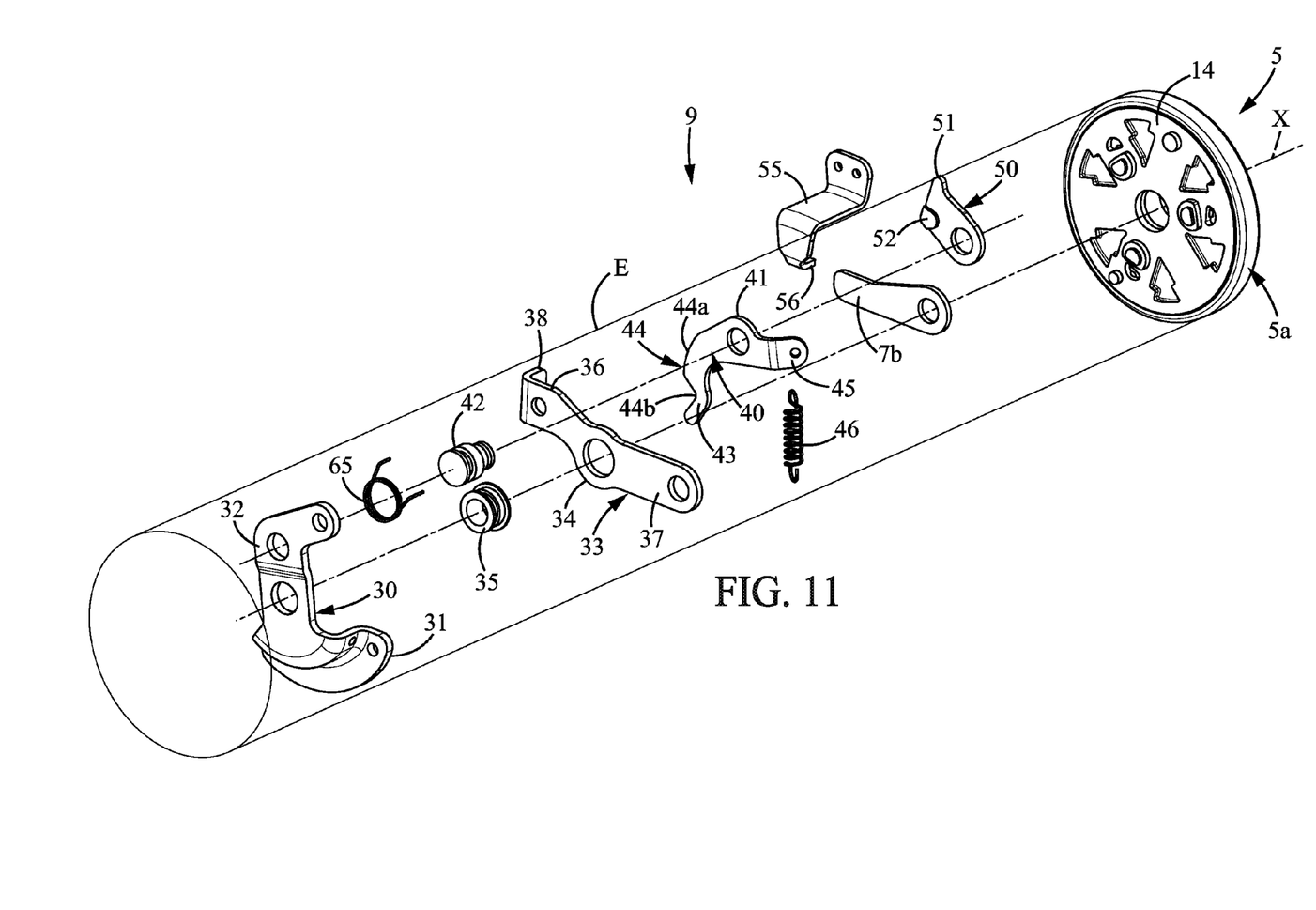
FIG. 11 is an exploded perspective view of the disabling system of FIG. 10.
Figure 12:
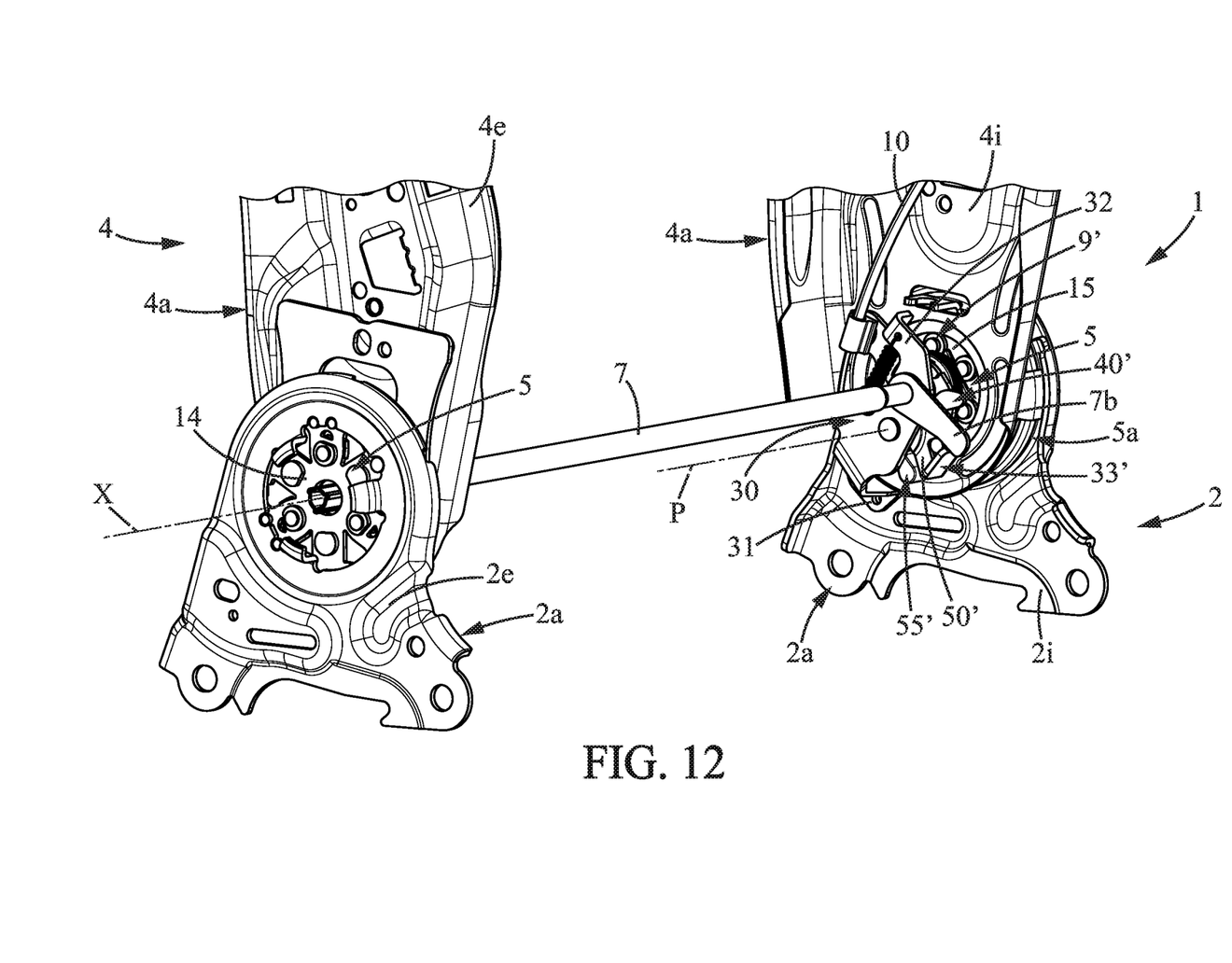
FIG. 12 is a perspective view of a portion of a vehicle seat according to a second embodiment of the invention, showing the disabling system of the hinge mechanism.

In an alternative shown in FIGS. 10 and 11, the disabling system 9 is external, i.e. placed on the side of the outer lateral surface 4e of one of the frames 4a of the backrest 4.

The fastening portion 31 of the flange 30 is then secured to the outer lateral surface 2e of the frame 2a of the seating portion 2 and the support portion 32 of the flange 30 faces the outer lateral surface 2e of the frame 2a of the seating portion 2. The support portion 32 of the flange 30 thereby faces the outer lateral surface of the fixed cheekplate 14 and the disabling system 9 can be mounted in a space arranged between the support portion 32 of the flange 30 and the outer lateral surface 2e of the frame 2a of the seating portion 2, facing the outer lateral surface of the fixed cheekplate 14.

In FIG. 10, the disabling system 9 is obtained by a symmetry with respect to a plane perpendicular to the rotation axis X combined with a rotation at 180°. The general structure and the operation of the disabling system 9 remain nevertheless unchanged so that the description that has already previously made is directly transposable to this alternative.

FIGS. 12 to 22 show a second embodiment of the vehicle seat. The second embodiment is described in relation with an internal disabling system 9', with the understanding that the description will be directly transposable to an external disabling system 9'.

As for the first embodiment, the components of the disabling system 9' are adapted to be contained in the radial overall dimension of the case 5a of the hinge mechanism 5.

However, the second embodiment mainly differs from the previously described first embodiment in that the disabling system 9' comprises a memory device for memorising the upright position of the backrest 4 adjusted by the user. In this way, after the user has folded the backrest 4 in order to allow for access to the rear seats or to a rear space located behind the seat 1, he can fold back the backrest 4 and return to the upright position that was adjusted prior to the folding.

To do so, as shown in FIGS. 12 to 16, conversely to the previously described disabling system 9, the leg 50' of the releasing device is secured to the retaining lever 40', of which the other functional portions remain unchanged. Thus, the leg 50' extends radially relative to the pivot axis P from the lower edge of retaining lever 40', between the hub 41 and the cam portion 44a of the guide surface 44.

Moreover, the abutment 55' of the releasing device comprises an annular portion 57' pivotally mounted about the rotation axis X and an arm 58' extending radially relative to the rotation axis X to an end provided with a finger 56' extending along the rotation axis X opposite the inner lateral surface 4i of the frame 4a of the backrest 4 so as to be able to cooperate with the leg 50'. As shown more in details in FIG. 14, the annular portion 57' of the abutment 55' comprises a bore 59' provided with inner teeth 60'. Furthermore, on a lateral surface perpendicular to the rotation axis X and facing the hub 34' of the disabling lever 33', the annular portion 57' comprises two diametrically opposite protruding ramps 61'. Each ramp 61' extends along the same circumferential direction L between an abutment surface 62' perpendicular to the lateral surface of the annular portion 57', and a guide surface 63' that is inclined relative to the lateral surface of the annular portion 57'. The hub 34' of the disabling lever 33' comprises corresponding openings 64' suited for receiving the ramps 61'.

Figure 13:
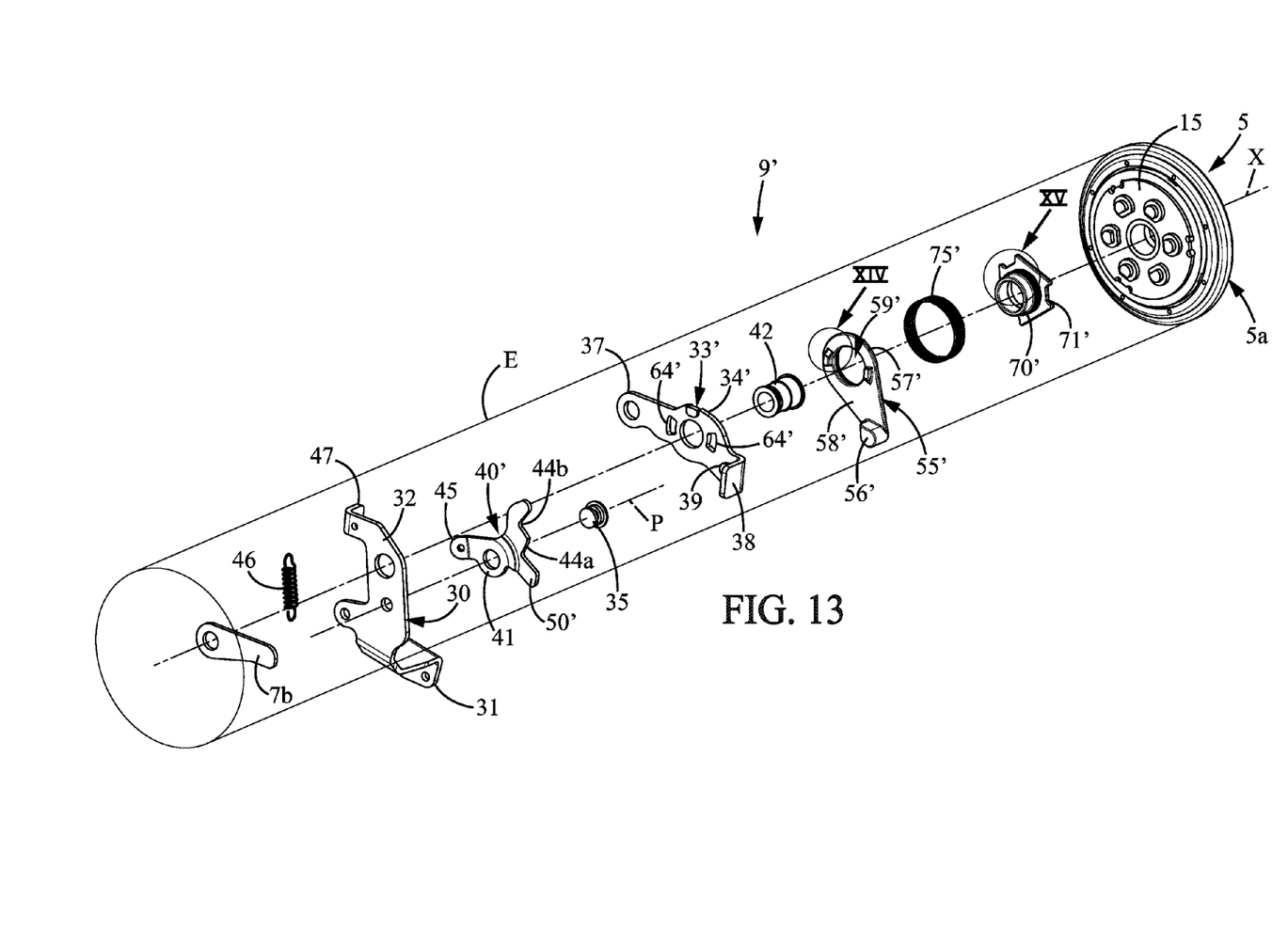
FIG. 13 is an exploded perspective view of the disabling system of FIG. 12, FIGS. 14 and 15 are enlarged views of the details referenced respectively as XIV and XV in FIG. 13, FIGS. 16 to 22 are views of the disabling system of FIG. 12 in successive different positions during the movement of the backrest between its upright and folded positions, FIG. 17 showing the disabling system as a cross-section along the orientation referenced as XVII-XVII in the position shown in FIG. 16, FIG. 19 showing the disabling system as a cross-section along the orientation referenced as XIX-XIX in the position shown in FIG. 18.
Figure 14:
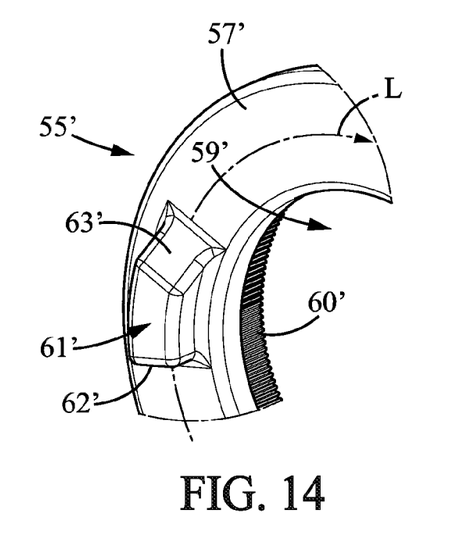
Figure 15:
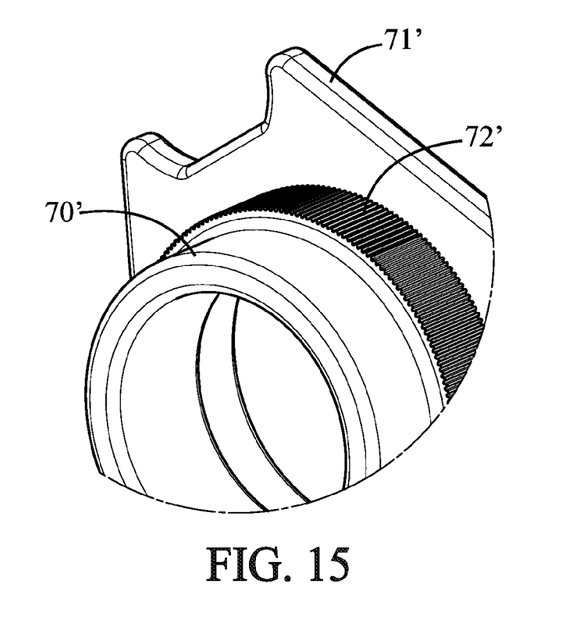

In FIGS. 13 and 15, the releasing device further comprises a bushing 70' extending along the rotation axis X from a flange 71' secured to the mobile flange 15. The bushing 70' is adapted to be received in the annular portion 57' of the abutment 50' and has an outer surface provided with outer teeth 72' adapted to cooperate with the inner teeth 60' of the abutment 55'. The teeth 60', 72' of the bushing 70' and of the abutment 55' have a pitch identical to that of the teeth 19, 20 of the mobile flange 15 and of the slides 18.

The other components of the disabling system 9 are substantially similar to those for the previously described disabling system 9 and reference will be made to the description that has already been given of them for more details.

Figure 16:
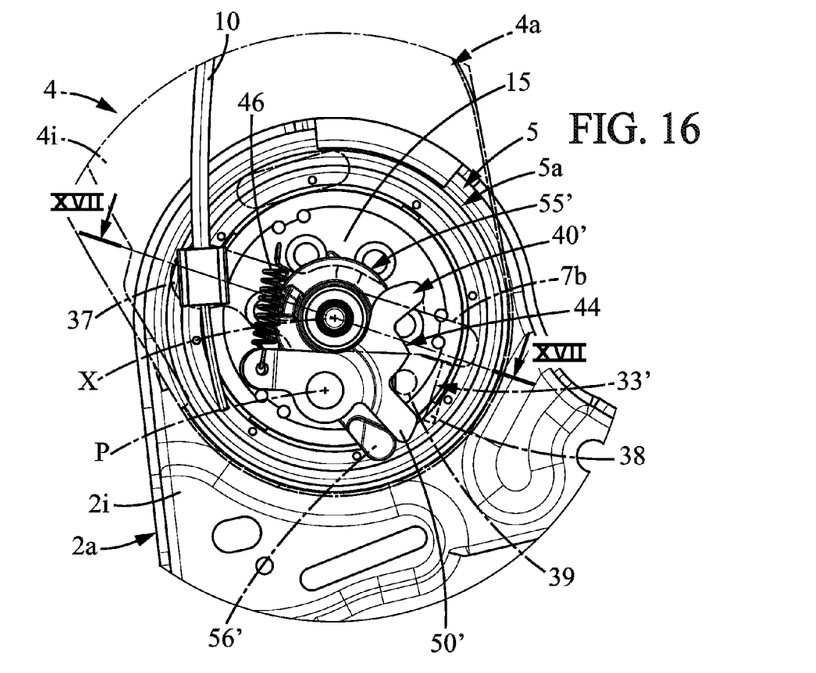
Figure 17:
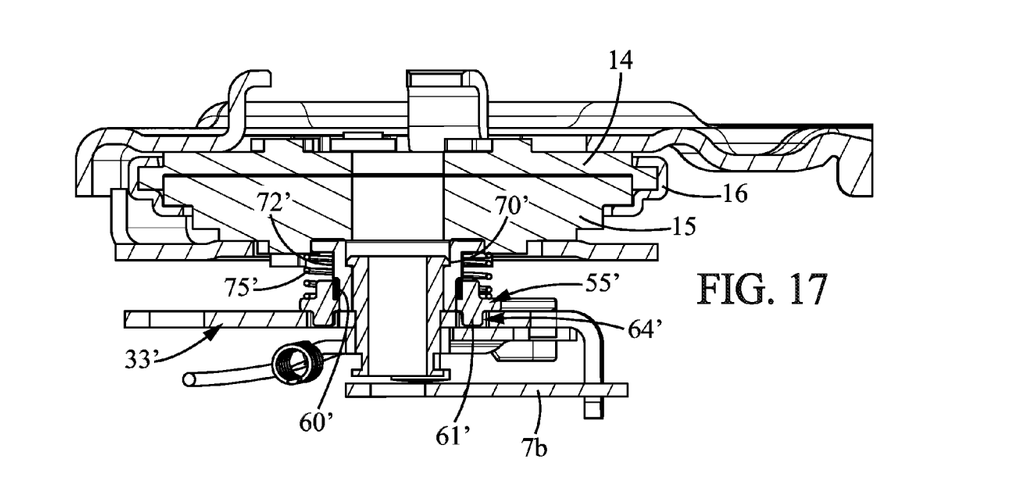

The disabling system 9' assembled in an rest state is shown in FIGS. 16, 17.

In this state, as explained hereinabove, the disabling lever 33 is in its inactive position, the control lever 7b resting on the finger 38 of the first arm 36 and being freely movable towards the actuating position in order to allow for adjusting of the upright position of the backrest 4. The retaining lever 40' is urged by the pulling spring 46 into the retracted position, the cam portion 44a of the guide surface 44 being maintained in contact with the pin 39 of the first arm 36 of the disabling lever 33'.

As shown in FIG. 17, the abutment 55' is urged by a compression spring 75' towards an unsecured position in which the abutment is spaced apart from the bushing 70' so as to be immobile relative to the backrest 4. In this position, the ramps 61' of the abutment 55' are arranged respectively in the openings 64' of the central hub 34' of the disabling lever 33' in inactive position. The inner teeth 60' of the abutment 55' are then spaced apart from the outer teeth 72' of the bushing 70'.

Figure 18:
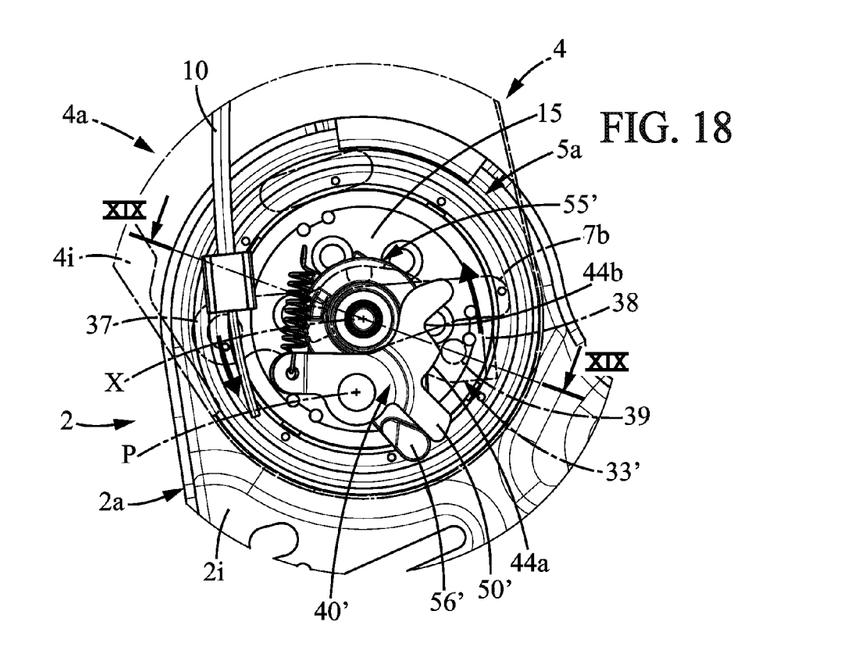
Figure 19:
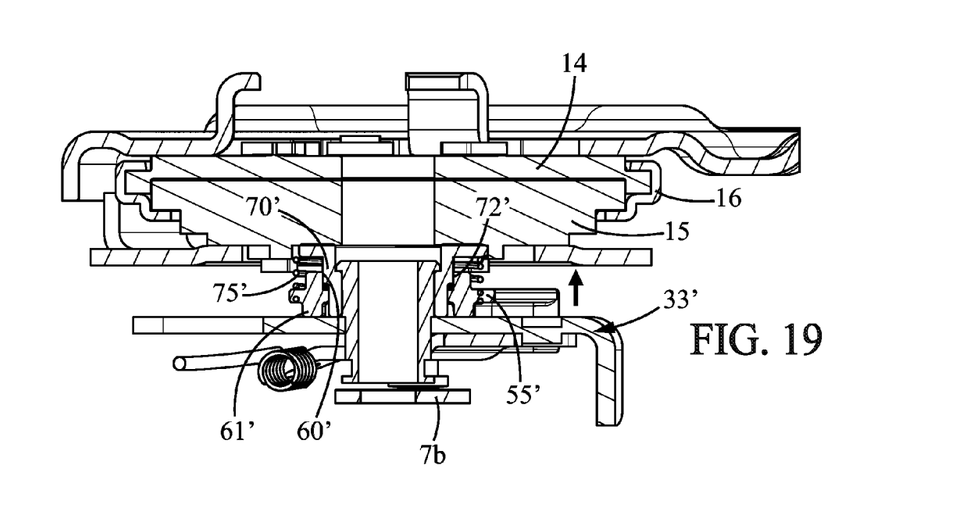

In FIGS. 18 and 19, when the user wants to swing the backrest 4 in the folding direction from the upright position towards the folded position, he actuates the hand lever 11. Meanwhile, the cable 10 pivots the disabling lever 33 towards the active position, the control lever 7b being moved towards its actuating position.

During this same movement, the guide surfaces 62' of the ramps 61' of the abutment 55' will slide on the edges of the openings 64' of the central hub 34' of the disabling lever 33' in order to exit therefrom and allow the ramps 61' to rest on the lateral surface of the disabling lever 33' facing the mobile flange 15. The abutment 55' can thereby be moved towards the bushing 70' in order to reach a secured position in which the inner teeth 60' of the abutment 55' are engaged with the outer teeth 72' of the bushing 70'. The abutment 55' is thereby secured to the backrest 4 in a relative position with respect to the leg 50' corresponding to the upright adjusted position of the backrest 4.

Figure 20:
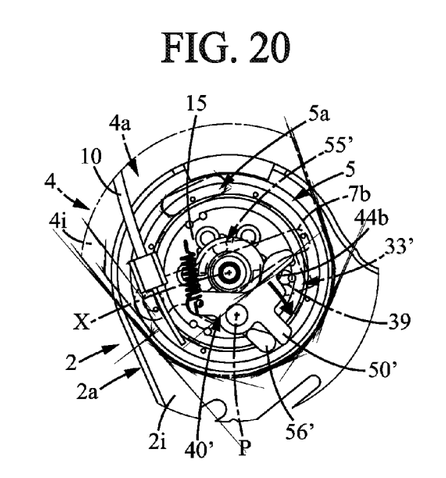

In FIG. 20, as explained hereinabove, during the movement of the disabling lever 33', the retaining lever 40' swings to the retaining position in order to maintain the disabling lever 33' in the active position.

Figure 21:
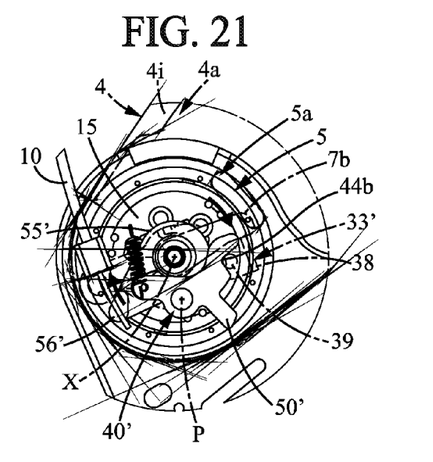

In FIG. 21, when the backrest 4 is pivoted in the folding direction from the upright position towards the folded position, the finger 56' of the abutment 55' is spaced apart from the leg 50' of the retaining lever 40'.

Figure 22:
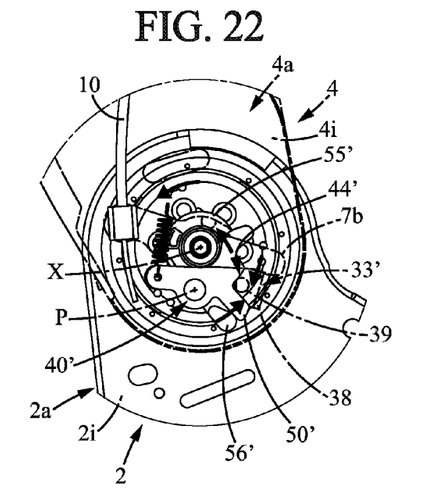

In FIG. 22, during the pivoting of the backrest 4 in the uprighting direction from the folded position towards the upright position, when, in the upright position of the backrest 4 adjusted prior to the folding back, the leg 50' of the retaining lever 40' interferes with the finger 56' of the abutment 55', the abutment 55' moves the leg 50' and the retaining lever 40' so as to release the pin 39 from the disabling lever 33'. Under the effect of the springs 24 of the locking systems 17 of the hinge mechanisms 5, the locking systems 17 return to their locked state, the disabling lever 33' returns to its inactive position and the control lever 7b returns to its rest position. The retaining lever 40 resting on the pin 39 of the disabling lever returns to its retracted position. The abutment 55' returns to its unsecured position.

The invention claimed is:

1. A vehicle seat comprising:
  a seating portion and a backrest pivotally mounted on the seating portion about a rotation axis, the backrest having an adjustable upright position and a folded position,
  at least one hinge mechanism adapted to adjust the upright position of the backrest, the hinge mechanism comprising a case delimiting a housing, a locking system placed in the housing of the case and a control member that can be actuated by a user, the case having an outer peripheral edge and comprising a first cheekplate secured to the seating portion and a second cheekplate secured to the backrest, the second cheekplate being pivotally mounted about the rotation axis on the first cheekplate, the locking system being adapted to have a locked state in which said locking system prevents pivoting of the second cheekplate relative to the first cheekplate, and an unlocked state in which said locking system authorizes said pivoting, the control member having a rest position towards which said control member is urged, and being movable towards an actuating position, the control member being connected to the locking system so that, in the rest position of said control member, the locking system is in the locked state, and in the actuating position of said control member, the locking system is in the unlocked state,
  a disabling system adapted to enable the backrest to move between the upright and folded positions, the disabling system being arranged outside of the case of the hinge mechanism, and comprising a disabling member that can be actuated by the user and a retaining member, the disabling member comprising a finger arranged to cooperate with the control member,
  wherein the disabling member is movable between:
    an inactive position in which said disabling member authorizes the control member to move between its rest and actuating positions, the control member in the rest position resting on the finger of the disabling member in the inactive position and the control member in the actuating position being spaced apart from the finger of the disabling member in the inactive position, and
    an active position in which said disabling member places the control member in the actuating position, the control member in the actuating position resting on the finger of the disabling member in the active position,
    the finger moving the control member from the rest position to the actuating position when the disabling member is moved from the inactive position to the active position,
  wherein the retaining member is movable relative to the seating portion between:
    a retaining position in which said retaining member maintains the disabling member in the active position, and
    a retracted position spaced apart from the retaining position,
  wherein the case of the hinge mechanism has a radial overall dimension defined by a cylindrical envelope extending along the rotation axis and passing by the outer peripheral edge of said case, and in that at least an essential portion, that is more than 50%, of the disabling member and at least an essential portion, that is more than 50%, of the retaining member are contained in the radial overall dimension of the case of the hinge mechanism.

2. The vehicle seat according to claim 1, wherein each of first and second cheekplates has an outer lateral surface opposite the housing and substantially perpendicular to the rotation axis, and the seating portion comprises a flange facing the outer lateral surface of one of the cheekplates chosen from among the first and second cheekplates, the disabling system being arranged between the flange and the outer lateral surface of said cheekplate.

3. The vehicle seat according to claim 1, wherein the disabling member is pivotally mounted on the rotation axis and has a maximum dimension measured perpendicularly to the rotation axis less than or substantially equal to a maximum dimension measured perpendicularly to the rotation axis of the outer edge of the case.

4. The vehicle seat according to claim 1, wherein the retaining member is pivotally mounted on the seating portion about a pivot axis parallel to the rotation axis, said pivot axis being located inside the envelope defining the radial overall dimension of the case of the hinge mechanism.

5. The vehicle seat according to claim 1, wherein the disabling system further comprises a coupling device adapted to move the retaining member from the retracted position to the retaining position when the disabling member is moved from the inactive position towards the active position.

6. The vehicle seat according to claim 5, wherein the coupling device comprises:
   two coupling elements, one formed by a pin and the other by a guide surface, and one carried by the disabling member and the other by the retaining member, with the guide surface having a cam portion and a hooking portion,
   a biasing member adapted to maintain the coupling element carried by the retaining member against the coupling element carried by the disabling member,
   the coupling elements being arranged so that the pin is moved along the cam portion of the guide surface when the disabling member is moved from the inactive position towards the active position, and so that the pin is placed in the hooking portion of the guide surface when the disabling member is in the active position.

7. The vehicle seat according to claim 1, wherein the disabling system further comprises a releasing device adapted to move the retaining member from the retaining position to the refracted position in a determined position of the second cheekplate relative to the first cheekplate during the pivoting of the backrest in an uprighting direction from the folded position towards the upright position.

8. The vehicle seat according to claim 7, wherein an essential portion, that is more than 50%, of the releasing device is contained in the radial overall dimension of the case of the hinge mechanism.

9. The vehicle seat according to claim 7, wherein the releasing device comprises:
   an abutment movable together with the backrest along a stroke, and
   a leg associated with the retaining member and extending in the stroke of the abutment, the leg being adapted to interfere with the abutment in the determined position of the second cheekplate relative to the first cheekplate during the pivoting of the backrest in the uprighting direction.

10. The vehicle seat according to claim 9, wherein the leg is urged towards a close position in which said leg is in contact with the retaining member, and is movable towards a spaced apart position in which said leg is spaced apart from the retaining member during the pivoting of the backrest in a folding direction from the upright position towards the folded position.

11. The vehicle seat according to claim 9, wherein the backrest comprises an frame having two opposite lateral surfaces substantially perpendicular to the rotation axis, the disabling member and the retaining member being placed on the side of one of the lateral surfaces of the frame of the backrest, the abutment being fixed on said lateral surface.

12. The vehicle seat according to claim 9, wherein the abutment is movably mounted relative to the backrest between an unsecured position in which said abutment is immobile relative to the backrest, and a secured position in which said abutment is secured to the backrest, the abutment being connected to the disabling member so that, in the inactive position of said disabling member, said abutment is in the unsecured position, and in the active position of said disabling member, said abutment is in the secured position.

13. The vehicle seat according to claim 12, wherein the releasing device further comprises a bushing secured to the second cheekplate and extending along the rotation axis, the abutment being pivotally mounted about the rotation axis and being secured to the bushing in the secured position of said abutment and spaced apart from the bushing in the unsecured position of said abutment.

14. The vehicle seat according to claim 13, wherein the locking system comprises inner teeth carried by the second cheekplate and at least one slide movably mounted inside the housing of the case along a radial direction relative to the rotation axis, the slide being provided with outer teeth adapted to cooperate with the inner teeth of the second cheekplate, the outer teeth of the slide being engaged with the inner teeth of the second cheekplate in the locked state of the locking system and being spaced apart from the inner teeth of the second cheekplate in the unlocked state of the locking system, the bushing and the abutment having respectively teeth, one inner and the other outer, adapted to cooperate with each other, the teeth of the abutment being engaged with the teeth of the bushing in the secured position of said abutment and the teeth of the abutment being spaced apart from the teeth of the bushing in the unsecured position of said abutment, the teeth of the bushing and of the abutment having a pitch identical to that of the teeth of the second cheekplate and of the slide.

* * * * *